United States Patent [19]

Greenwood et al.

[11] Patent Number: 4,894,268

[45] Date of Patent: Jan. 16, 1990

[54] STRETCH BLOW-MOLDED POLYETHYLENE TEREPHTHALATE WIDE MOUTH CONTAINER AND INTERMEDIATE ARTICLE

[75] Inventors: Donald L. Greenwood, Hartsville; Donald W. Hayward, Florence, both of S.C.

[73] Assignee: Sonoco Products Company, Hartsville, S.C.

[21] Appl. No.: 129,706

[22] Filed: Dec. 7, 1987

[51] Int. Cl.⁴ .......................... B65D 1/02; B65D 23/00
[52] U.S. Cl. .................................. 428/36.42; 215/1 C;
 220/70; 428/212; 428/542.8; 428/910
[58] Field of Search ...................... 428/35, 36.92, 212,
 428/542.8, 910; 215/1 C; 220/70; 264/532, 536

[56] References Cited

U.S. PATENT DOCUMENTS 4,502,607 3/1985 Szajna ................................... 220/70
4,704,243 11/1987 Nilsson et al. ...................... 264/532

Primary Examiner—James J. Seidleck
Attorney, Agent, or Firm—Bell, Seltzer, Park & Gibson

[57] ABSTRACT

This invention provides a wide mouth container and intermediate article formed by stretch blow-molding an injection-molded preform of polyethylene terephthalate suitable for packaging tennis balls or other contents under pressure. The container includes an improved base construction which will withstand internal pressure with controlled minimal distortion and an improved flange construction surrounding the wide mouth which provides desired strength and thickness for receiving a metal end closure by double seaming operations and which is formed by a unique accommodation portion in the intermediate article which has a stepped wall construction.

16 Claims, 3 Drawing Sheets

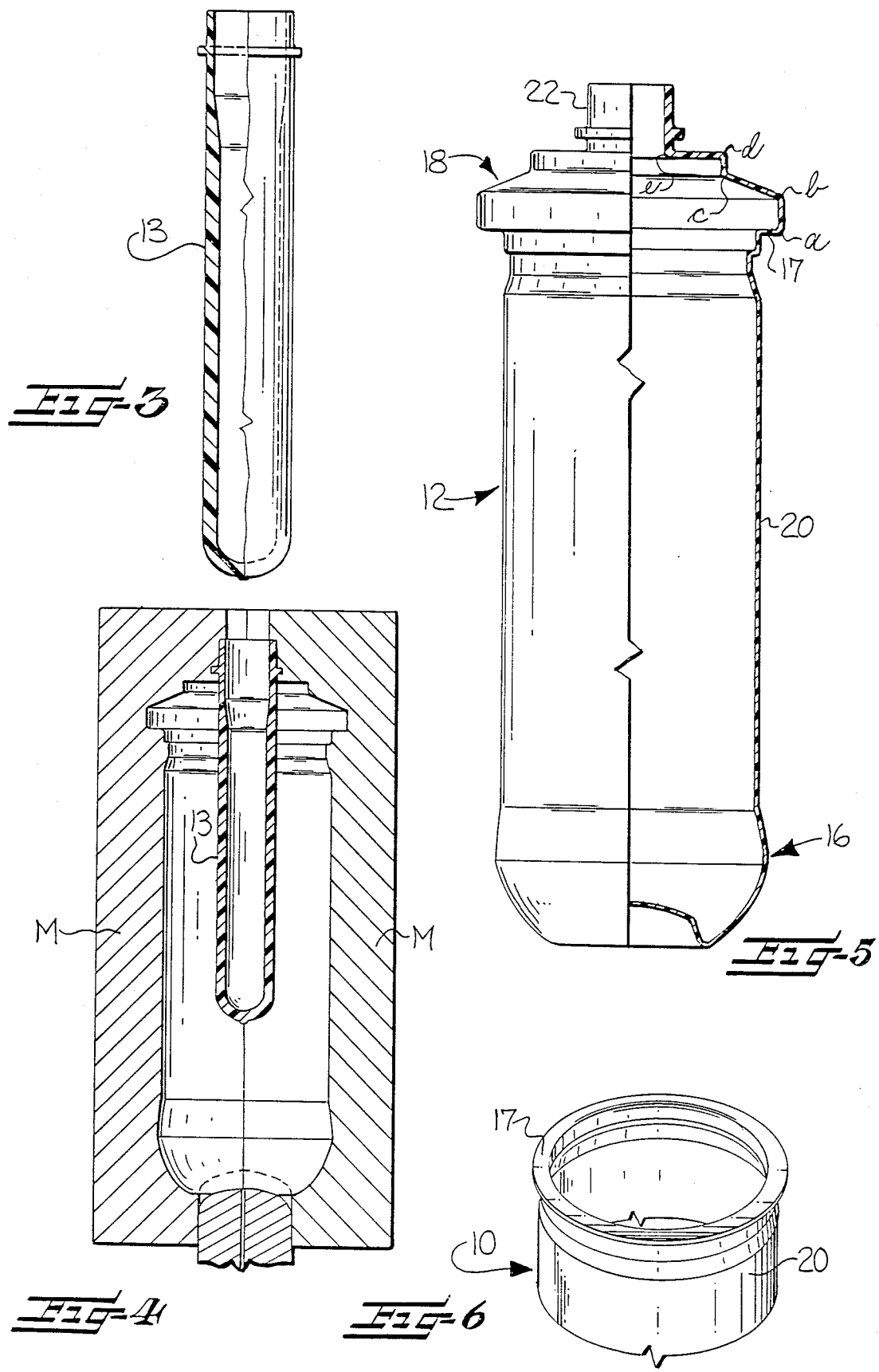

STRETCH BLOW-MOLDED POLYETHYLENE TEREPHTHALATE WIDE MOUTH CONTAINER AND INTERMEDIATE ARTICLE

FIELD OF THE INVENTION

This invention relates to a wide mouth container and intermediate article formed by stretch blow-molding an injection-molded preform of polyethylene terephthalate (PET) suitable for packaging tennis balls or other contents under pressure and being characterized by an improved base construction which will withstand internal pressure with controlled minimal distortion and by an improved flange construction surrounding the wide mouth providing desired strength and thickness for receiving a metal end closure by double seaming operations and formed by a unique accommodation portion in the intermediate article.

BACKGROUND OF THE INVENTION

It has heretofore been established that many material characteristics of polyethylene terephthalate (PET) are improved by high biaxial molecular orientation of the plastic during blow-molding, particularly when manufacturing containers for packaging contents under pressure, such as disclosed in U.S. Pat. No. 3,733,309. In practice, the injection-molded preform design is such that molecular orientation may take place in both axes of the container by holding the preform in a mold cavity having the volumetric configuration of the desired article, stretching the preform longitudinally within the mold and expanding the preform transversely with high pressure air into the final shape of the article and mold cavity.

Prior container designs of biaxial molecular oriented PET, particularly for carbonated beverages, utilize a free-standing highly oriented base design which purportedly lends strength and rigidity necessary to withstand elevated pressures. The methodology for formation of freestanding pressure-resisting bases for these types of PET biaxial molecular oriented containers is described in U.S. Pat. No. 3,598,270 for a "petaloid" type base and in U.S. Pat. No. 4,465,199 for a "champagne" type base. However, both of these types of bases in a stretch blow-molded PET container are difficult to form, since they require high blowing pressures and/or secondary mold motions in order to stretch and blow the PET material into tight and highly defined annular spaces.

It has also been determined, in wide-mouth stretch blow-molded PET containers, that it is desirable to have a high biaxial molecular oriented flange of desired strength and thickness extending radially outwardly from around the wide open mouth for receiving a metal end closure by conventional double seaming operations to close the stretch blowmolded PET container with pressurized contents, such as tennis balls, therein. Such a stretch blow-molded widemouth PET flanged container is disclosed in U.S. Pat. Nos. 4,496,064 and 4,567,843 which is described as requiring complete biaxial molecular orientation for adequate performance. The method described in these patent discloses the formation of an intermediate article utilizing an oblique truncated cone type of accommodation area, including the flange portion surrounding the wide open mouth of the tubular body, which imparts a gradual increase in biaxial molecular orientation from a neck area at the top to the flange portion at the bottom of the accommodation portion. The accommodation portion is then removed by cutting through the flange to provide a container having a flange around the open mouth with biaxial molecular orientation. However, the design of the accommodation portion in the form of the oblique truncated cone makes it difficult to consistently control the degree of biaxial molecular orientation and the thickness of the flange material which often results in undesirable strength and thickness in the flange for receiving a metal end closure by double seaming operations.

OBJECTS AND SUMMARY OF THE INVENTION

Accordingly, it is the object of this invention to overcome the above problems with prior stretch blow-molded PET wide-mouth containers and to provide a wide mouth container and intermediate article formed by stretch blowmolding an injection-molded preform of a polyethylene terephthalate (PET) suitable for packaging tennis balls or other contents under pressure and which has an improved base construction which will withstand internal pressure with controlled minimal distortion and an improved flange portion surrounding the wide mouth of desired strength and thickness for receiving a metal end closure by double seaming operations which is formed by a unique accommodation portion in the intermediate article.

By this invention, it has been found that the above object may be accomplished by providing an intermediate article and a wide-mouth container article fabricated therefrom, wherein the intermediate article is formed by stretch blow-molding an injection-molded preform of PET, and which are constructed generally, as follows.

The container article and the intermediate article include a tubular body portion of high biaxial molecular orientation and a base portion of low biaxial molecular orientation integrally extending from a lower end of the tubular body portion and having means incorporated therein for providing free-standing ability to the fabricated container and for controlling distortion by internal pressure.

The base portion preferably comprises a "champagne"type base including an outer peripheral wall integrally extending at one end from the lower end of the tubular body portion and defining a spherical segment of a predetermined radius, a standing ring integrally extending at one end from the other end of the outer peripheral wall and defining an annular toroidal segment of a predetermined radius, an inner standing wall integrally extending at one end from the other end of the standing ring and defining a frustum of a right circular cone, and a central dome of essentially non-biaxial molecular orientation and integrally extending from the other end of the inner standing wall and defining a spherical segment of a predetermined radius.

With this construction of the base portion, the juncture of the central dome and the inner standing wall and the juncture of the outer peripheral wall with the standing ring comprise first and second hinge means located at the points of accummulation of stresses on the base portion as a result of internal pressure applied downwardly on the central dome for allowing controlled minimal distortion of the base portion by outward and downward movement of the first hinge means and outward movement of the second hinge means without significantly changing the volume of the container or the free-standing ability of the base portion.

The improved flange of high biaxial molecular orientation integrally extending around and radially outwardly from the upper open end of the tubular body portion of the wide mouth container article and having the desired strength and thickness for receiving a closure, preferably a metal end closure by double seaming operations, is provided by stretch blow-molding a unique accommodation portion in the intermediate article which extends from the upper end of the tubular body portion and includes the following. A flange of high biaxial molecular orientation extends around and radially outwardly from the upper open end of the tubular body portion and is adapted to be annularly cut to remove the remainder of the accommodation portion during fabrication of the wide-mouth container from the intermediate article. A stepped wall portion of decreasing biaxial molecular orientation extends around and upwardly and inwardly from the flange and includes at least two successive upwardly and inwardly extending step means or areas for collecting a quantity of PET during blow-molding and for increasing biaxial molecular orientation and controlling the thickness of the flange.

BRIEF DESCRIPTION OF THE DRAWINGS

While some of the objects and advantages, along with a summary, of this invention have been set forth above, other objects and advantages, along with a detailed description of a preferred embodiment, of this invention will be described below in conjunction with the following drawings, in which:

FIG. 3 is a sectional view in elevation of the injection-molded preform used to stretch blow-mold the intermediate article of FIG. 2;

FIG. 4 is a schematic sectional view in elevation of a typical mold of a stretch blow-molding apparatus showing the preform of FIG. 3 secured therein immediately prior to stretch blow-molding the intermediate article of FIG. 2;

FIG. 5 is an elevational view of the intermediate article of FIG. 2 with half of the article broken away and shown in section;

FIG. 6 is a partial perspective view of the top portion of the container article of FIG. 1, without the metal end closure, after the accommodation portion of the intermediate article of FIGS. 2 and 3 has been cut and removed;

DETAILED DESCRIPTION OF PREFERRED EMBODIMENT OF THE INVENTION

Figure 1:
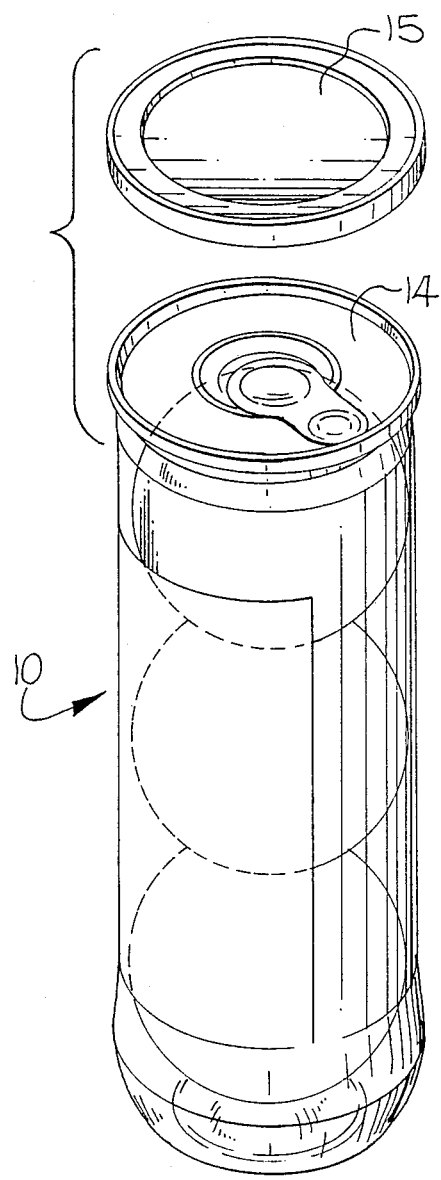
FIG. 1 is perspective view of a container constructed in accordance with this invention and containing tennis balls under pressure and having a metal end closure double seamed thereto and protective top shown exploded therefrom.
Figure 2:
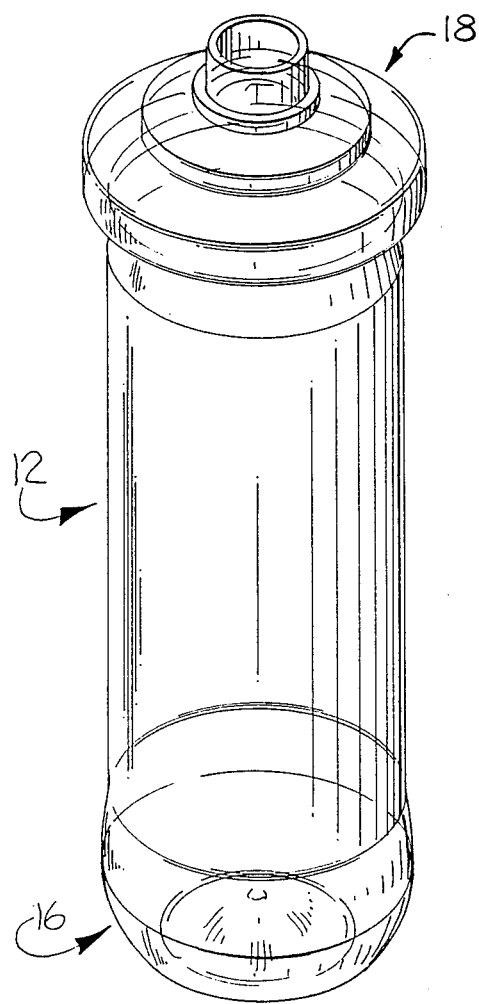
FIG. 2 is a perspective view of the intermediate article as it comes from the stretch blow-molding equipment and from which the container of FIG. 1 is fabricated.

Referring now to the drawings, a container 10 (FIG. 1) is fabricated from an intermediate article 12 (FIG. 2) which is formed by stretch blow-molding an injection-molded preform 13 (FIG. 3) of polyethylene terephthalate (PET). The container 10, as illustrated in the drawings and described in connection with this preferred embodiment, is a wide-mouth container suitable for packaging tennis balls under pressure (FIG. 1) by closing the wide mouth open end of the container 10 using a metal end closure 14 which is covered by a protective cap 15. The container 10 and intermediate article 12 of this invention are characterized by an improved base 16 construction which will withstand internal pressure with controlled minimal distortion and by an improved flange 17 construction (FIG. 6) surrounding the wide mouth and providing desired strength and thickness for receiving the metal end closure 14 by conventional double seaming operations and formed by a unique accommodation portion 18 (FIGS. 2 and 5) in the intermediate article 12, as described more fully below.

However, it is to be understood that while the preferred embodiment of the container 10 described herein is in the form of a wide mouth container for packaging tennis balls (FIG. 1), the unique and characterizing features of the container of this invention may be utilized in other wide-mouth containers for packaging other contents under pressure. Also, the improved flange construction 17 may be utilized with wide-mouth containers which utilize other types of base constructions and the improved base construction 16 may be utilized in containers, other than wide-mouth containers, which package contents under pressure.

As mentioned above, the intermediate article 12, from which the wide-mouth container 10 is fabricated, is formed by stretch blow-molding an injection-molded preform 13 of PET. As is well known by those with ordinary skill in the art and as more fully described in the above mentioned U.S. Pat. No. 3,733,309, the injection-molded preform 13 is placed in the mold M (FIG. 4) of a stretch blow-molding apparatus and is then mechanically stretched in the longitudinal direction and expanded in the transverse direction by high pressure air into the final shape of the intermediate article 12 and the shape of the cavity of the mold M which has the volumetric configuration of the desired article. As a result, biaxial molecular orientation of the PET material and resulting intermediate product 12 is obtained. However, as will be described below, this biaxial molecular orientation varies, particularly in the top accommodation portion 18 and the bottom base portion 16 of the intermediate product 12. This stretch blow-molding operation is well understood by those with ordinary skill in the art and further explanation and discussion is not believed to be necessary for an understanding of the present invention.

The resulting stretch blow-molded PET intermediate product 12 (FIGS. 2 and 5) include a tubular body portion 20 of high biaxial molecular orientation by both longitudinal and transverse stretching of the PET material during stretch blow-molding. The intermediate article 12 further includes an accommodation portion 18 intergrally extending from an upper end of the tubular body portion 20 and defining the flange 17, which has a high biaxial molecular orientation, extending around and radially outwardly from the upper open end of the tubular body portion 20 and which is adapted to be annularly cut at an intermediate location to remove the remainder of the accommodation portion 18 while leaving a portion of the flange 17 intergrally connected to the body portion 20 of the container 10 (FIG. 6) for receiving the closure 14.

The accommodation portion 18 further includes a stepped wall portion, indicated by the reference characters a, b, c, d, e, (FIG. 5) of decreasing biaxial molecular orientation extending around and upwardly and inwardly from the flange 17 and including at least two successive upwardly and inwardly extending stepped areas a, b, c and c, d, e. This stepped wall portion a, b, c, d, e terminates in a neck portion 22 which has no biaxial molecular orientation since it is utilized (FIG. 4) to secure the preform 13 within the mold M of the stretch blow-molding apparatus. This unique stepped wall accommodation portion 18 is designed to allow for controlled biaxial molecular orientation of the PET material in the flange 17 and to control thickness of the flange 17. The stepped wall a, b, c, d, e acts to collect an amount of PET during stretch blow-molding and captures an increasing amount of PET material in each of the steps a, b, c and c, d, e during the stretch blow-molding operation. Thus, the step c, d, e contains more PET material and has less biaxial molecular orientation than does the step a, b, c. This unique stepped wall also provides distinct points of demarkation between such levels of biaxial molecular orientation resulting in a high degree of biaxial molecular orientation in the flange 17 and a controlled uniform thickness in the flange 17, both of which characteristics improve the ability to attach a metal end closure by double seaming operations to the flange 17.

In contrast, prior wide-mouth container articles fabricated from an intermediate article formed by stretch blow-molding an injection-molded preform of PET utilized an accommodation portion in the form of an oblique truncated cone, as shown in the above mentioned U.S. Pat. Nos. 4,496,064 and 4,576,843. This type of conical wall would be in the cross-sectional shape defined by a line extending from reference character b to c to e (a portion of which is indicated by a dotted line in FIG. 5) and would result in a gradual increase in biaxial molecular orientation of the accommodation portion from the neck at the top to the flange at the bottom. This variance in degree of biaxial molecular orientation through the flange and, thus, thickness in the flange does not always produce a flange of desired strength and thickness for receiving a metal end closure by double seaming operations.

Figure 7:
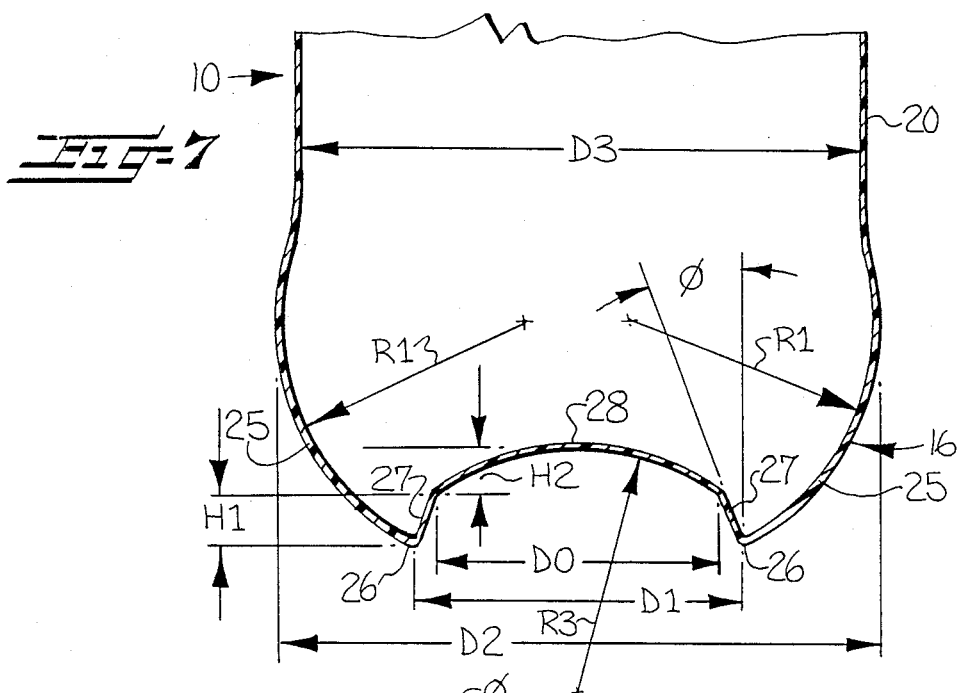
FIG. 7 is a sectional view in elevation of the base portion of the container article and intermediate article of FIGS. 1, 2 and 5.
Figure 8:
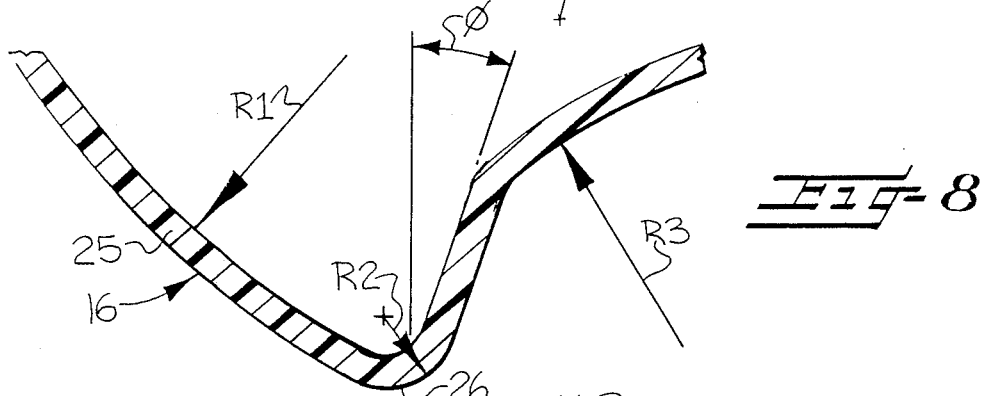
FIG. 8 is an enlarged sectional view of a portion of the base portion illustrated in FIG. 7 and showing further details of radiuses, dimensions and angles of segments thereof.

The container 10 and intermediate article 12 both include an improved base portion 16 of low biaxial molecular orientation which integrally extends from a lower end of the tubular body portion 20 and includes means, to be described below, for providing free-standing ability to the container 10 and for controlling distortion by internal pressure. This base portion 16 is preferably of the "champagne" type and comprises (FIG. 7) an outer peripheral wall 25 integrally extending at one end from the lower end of the tubular body portion 20 and defining a spherical segment of two bases having a predetermined radius R1. The base further includes a standing ring 26 integrally extending at one end from the other end of the outer peripheral wall 25 and defining an annular toroidal segment of a predetermined radius R2 (FIG. 8). This standing ring 26 provides the free-standing ability to the container 10. The base portion 16 further includes an inner standing wall 27 integrally extending at one end from the other end of the standing ring 26 and defining a frustum of a right circular cone. Lastly, the base portion 16 includes a central dome 28 of nonbiaxial molecular orientation and integrally extending from the other end of the inner standing wall 27 and defining a spherical segment of one base having a predetermined radius R3 to close the bottom of the base portion 16.

Figures 10, 11:
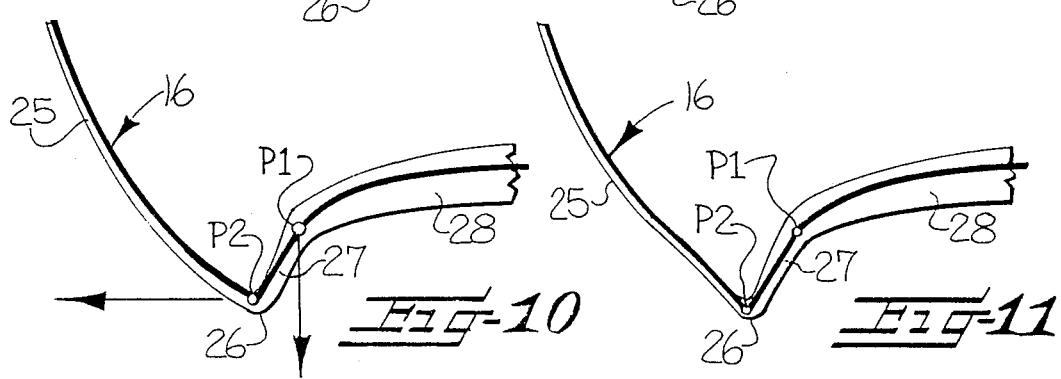
FIG. 10 is a partial sectional view of one side of the base portion showing schematically the hinge means in the base portion for controlled minimal distortion of the base portion under internal pressures.
FIG. 11 is a view, like FIG. 10, showing a partial section of the base portion after controlled minimal distortion has occurred.

The dynamics of the above described design of this base portion 16 are such that the juncture of the central dome 28 and the inner standing wall 27 and the juncture of the outer peripheral wall 25 and the standing ring 26 form first and second pivot or hinge means, indicated schematially at P1 and P2 (FIGS. 10 and 11), located at the points of accumulation of stresses on the base portion 16 as a result of internal pressure applied downwardly on the central dome 28 for allowing controlled distortion of the base portion by outward and downward movement of the first hinge means P1 and outward movement of the second hinge means P2, as shown schematically by the arrows in FIG. 10, from the position indicated in FIG. 10 to that indicated in FIG. 11 without significantly changing the volume of the container 10 or the free standing ability of the base portion 16. Thus, the hinge means P1, P2 react to bending moments of the base and the arm connecting hinge means P1, P2 increases in angle to the vertical as a result of the controlled distortion of the base portion 16 and urges the formation of a compound radius in the outer peripheral wall means 25 with the resultant deformation of the base portion 16, as shown in FIG. 11. The free standing ability of the base portion 16, as provided by the standing ring 26, does not change, as may be clearly seen from a comparison of FIGS. 10 and 11.

The following dimensional relationships have been determined to be preferable to the above functioning of the base portion 16 to provide controlled minimal distortion. The diameter D2, which is the maximum diameter of the base 16, is preferably greater than the diameter D3 of the tubular body portion 20. The radius R1 of the outer peripheral wall 25 should preferably be identical to the radius R3 of the central dome 28. The radius R2 of the standing ring 26 is preferably between 4 to 6 percent of the radius R1 of the outer peripheral wall 25 and the radius R3 of the central dome 28.

The sum of the surface areas of the outer peripheral wall 25, the standing ring 26, the inner standing wall 27 and the central dome 28 is preferably equal to the surface area of a perfect hemisphere having a radius equal to the radius R1 of the outer peripheral wall 25 or the radius R3 of the central dome 28. The ratio of the maximum diameter D2 of the base portion 16 to the inside diameter D1 of the standing ring 26 is preferably between 1.5 to 1.7. The height H1 of the inner standing wall 27 can be adjusted to meet the preferable surface area requirements set forth above and is preferably equal to the height H2 of the central dome 28. The inner standing wall 27 is at an angle $\phi$ preferably of from 7 to 10 degrees to the vertical or to a longitudinal axis through the article 10.

Figure 9:
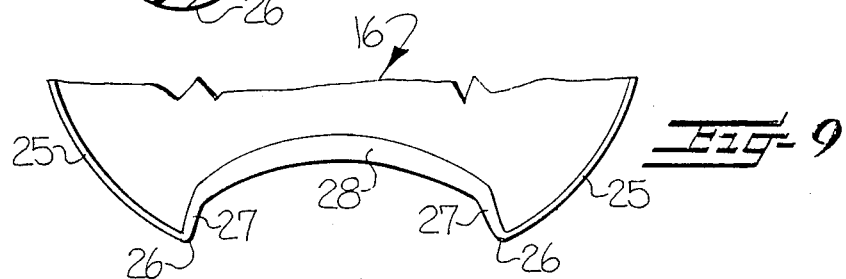
FIG. 9 is a section view of a portion of the base portion of FIG. 7 illustrating particularly thicknesses in the various segments of the base portion.

As mentioned above, the central dome 28 essentially has no biaxial molecular orientation and, therefore, is of a thickness greater than the thickness of the remaining segments 25, 26, 27. As may be seen in FIG. 9, the thicknesses of the outer peripheral wall 25, the standing ring 26, the inner standing wall 27 and the central dome 28 progressively increase. On a weight basis, the central dome 28, inner standing wall 27 and standing ring 26 comprise between 15 and 20 percent of the total weight of the container 10.

Thus, this invention has provided a wide mouth container 10 and an intermediate article 12 formed by stretch blow-molding an injection-molded preform 13 of PET which is suitable for packaging tennis balls or other contents under pressure and which is characterized by an improved base construction 16 which will withstand internal pressure with controlled minimal distortion and by an improved flange construction 17 surrounding the wide mouth which provides desired strength and thickness for receiving a metal end closure 14 by double seaming operations and which is formed by a unique accommodation portion 18 in the intermediate article 12 which has a stepped wall construction.

In the drawings and specification there have been set forth a preferred embodiment of this invention, and although specific terms are employed, they are used in a generic and descriptive sense only and not for purposes of limitation, the scope of the invention is defined in the following claims.

What is claimed is:

1. A wide-mouth container article fabricated from an intermediate article formed by stretch blow-molding an injection-molded preform of polyethylene terephthalate and being suitable for packaging tennis balls or other contents under pressure and being characterized by a construction which will withstand internal pressures with controlled minimal distortion; said container article comprising:

a tubular body portion of high biaxial molecular orientation;

a flange of high biaxial molecular orientation integrally extending around and radially outwardly from the upper open end of said tubular body portion and being of desired strength and thickness for receiving a metal end closure by double seaming operations; and a champagne type base portion of low biaxial molecular orientation and integrally extending from the lower end of said tubular body portion and constructed to provide free-standing ability to the fabricated container and to control distortion by internal pressure, said champagne type base portion comprising an outer peripheral wall integrally extending downwardly from the lower end of said tubular body portion and defining a spherical segment of a predetermined radius, a standing ring integrally extending inwardly from the lower end of said outer peripheral wall and defining an annular toroidal segment of a predetermined radius, and an inner standing wall integrally extending upwardly and inwardly from said standing ring and defining a frustum of a right circular cone, and a central dome of essentially non-biaxial molecular orientation and integrally extending upwardly and inwardly from said inner standing wall and defining a spherical segment of a predetermined radius, the juncture of said central dome and said inner standing wall and the juncture of said outer peripheral wall and said standing ring comprise responsive first and second hinge means located at the points of accumulation of stresses on said base portion as a result of internal pressure applied downwardly on said central dome for allowing controlled distortion of said base portion by outward and downward movement of said first hinge means and outward movement of said second hinge means without significantly changing the volume of the container or the free-standing ability of said base portion.

2. A container article fabricated from an intermediate article formed by stretch blow-molding an injection-molded preform of polyethylene terephthalate and being suitable for packaging contents under pressure and being characterized by a base construction which will withstand internal pressures with controlled minimal distortion; said container article comprising:

a tubular body portion of high biaxial molecular orientation; and a champagne type base portion of low biaxial molecular orientation and integrally extending from the lower end of said tubular body portion and constructed to provide free-standing ability to the fabricated container and to control distortion by internal pressure, said champagne type base portion comprising an outer peripheral wall integrally extending downwardly from the lower end of said tubular body portion and defining a spherical segment of a predetermined radius, a standing ring integrally extending inwardly from the lower end of said outer peripheral wall and defining an annular toroidal segment of a predetermined radius, and an inner standing wall integrally extending upwardly and inwardly from said standing ring and defining a frustum of a right circular cone, and a central dome of essentially non-biaxial molecular orientation and integrally extending upwardly and inwardly from said inner standing wall and defining a spherical segment of a predetermined radius, the juncture of said central dome and said inner standing wall and the juncture of said outer peripheral wall and said standing ring comprise respective first and second hinge means located at the point of accumulation of stresses on said base portion as a result of internal pressure applied downwardly on said central dome for allowing controller distortion of said base portion by outward and downward movement of said first hinge means and outward movement of said second hinge means without significantly changing the volume of the container or the free-standing ability of said base portion.

3. An intermediate article formed by stretch blow-molding an injection-molded preform of polyethylene terephthalate for fabrication into a wide-mouth container suitable for packaging tennis balls or other contents under pressure and being characterized by a construction which will withstand internal pressures with minimal distortion at the base and by a flange construction surrounding the mouth of desired strength and thickness for receiving a closure; said intermediate article comprising:

a tubular body portion of high biaxial molecular orientation;

a base portion of low biaxial molecular orientation and integrally extending from a lower end of said tubular body portion and having means for providing free-standing ability to the fabricated container and for controlling distortion by internal pressure; and an accommodation portion integrally extending from an upper end of said tubular body portion and comprising (1) a flange of high biaxial molecular orientation extending around and radially outwardly from the upper open end of said tubular body portion and being adapted to be annularly cut at an intermediate location to remove said accommodation portion during fabrication of the widemouth container from said intermediate article, and (2) a stepped wall portion of decreasing biaxial molecular orientation extending around and upwardly and inwardly from said flange and including at least two successive upwardly and inwardly extending step means for collecting a quantity of polyethylene terephthalate during blow-molding and for increasing biaxial molecular orientation and controlling the thickness of said flange.

4. An intermediate article, as set forth in claim 3, in which said base portion comprises a champagne type base including an outer peripheral wall integrally extending downwardly from the lower end of said tubular body portion and defining a spherical segment of a predetermined radius, a standing ring integrally extending inwardly from the lower end of said outer peripheral wall and defining an annular toroidal segment of a predetermined radius, an inner standing wall integrally extending upwardly and inwardly from said standing ring and defining a frustum of a right circular cone, and a central dome of essentially non-biaxial molecular orientation and integrally extending upwardly and inwardly said inner standing wall and defining a spherical segment of a predetermined radius.

5. An article, as set forth in claim 4, in which the juncture of said central dome and said inner standing wall and the juncture of said outer peripheral wall and said standing ring comprise respective first and second hinge means located at the points of accumulation of stresses on said base portion as a result of internal pressure applied downwardly on said central dome for allowing controlled distortion of said base portion by outward and downward movement of said first hinge means and outward movement of said second hinge means without significantly changing the volume of the container or the free-standing ability of said base portion.

6. An article, as set forth in claim 1, 2 or 4, in which the maximum diameter of said base portion is greater than the diameter of said tubular body portion.

7. An article, as set forth in claim 1, 2 or 4, in which the radius of said outer peripheral wall of said base portion is substantially identical to the radius of said central dome of said base portion.

8. An article, as set forth in claim 7, in which the radius of said standing ring of said base portion is between 4 to 6 percent of the radius of said outer peripheral wall and said central dome of said base portion.

9. An article, as set forth in claim 1, 2 or 4, in which the diameter of said outer peripheral wall of said base portion is greater than the diameter of said tubular body portion, the radius of said outer peripheral wall of said base portion is substantially identical to the radius of said central dome of said base portion, and the radius of said standing ring of said base portion is between 4 to 6 percent of the radius of said outer peripheral wall and said central dome of said base portion.

10. An article, as set forth in claim 1, 2 or 4, in which the sum of the surface areas of said outer peripheral wall, said standing ring, said inner standing wall and said central dome of said base portion is substantially equal to the surface area of a perfect hemisphere having a radius equal to the radius of said outer peripheral wall.

11. An article, as set forth in claim 1, 2 or 4, in which the ratio of the maximum diameter of said base portion to the inside diameter of said standing ring of said base portion is between 1.5 to 1.7.

12. An article, as set forth in claim 1, 2 or 4 in which the height of said inner standing wall and the height of said central dome of said base portion are substantially equal.

13. An article, as set forth in claim 1, 2 or 4, in which said inner standing wall of said base portion is at an angle of from 7 to 10 degrees to a longitudinal axis through said article.

14. An article, as set forth in claim 1, 2 or 4, in which the wall thickness of said base portion progressively increases from said outer peripheral wall to said standing ring to said inner standing wall to said central dome.

15. An article, as set forth in claim 4, in which the juncture of said central dome and said inner standing wall and the juncture of said outer peripheral wall and said standing ring comprise respective first and second hinge means located at the points of accumulation of stresses on said base portion as a result of internal pressure applied downwardly on said central dome for allowing controlled distortion of said base portion by outward and downward movement of said first hinge means and outward movement of said second hinge means without significantly changing the volume of the container or the free-standing ability of said base portion, the diameter of said outer peripheral wall of said base portion being greater than the diameter of said tubular body portion, the radius of said outer peripheral wall of said base portion being substantially identical to the radius of said central dome of said base portion, the radius of said standing ring of said base portion being between 4 to 6 percent of the radius of said outer peripheral wall and said central dome of said base portion, the sum of the surface area of said outer peripheral wall, said standing ring, said inner standing wall and said central dome of said base portion being substantially equal to the surface area of a perfect hemisphere having a radius equal to the radius of said outer peripheral wall, the ratio or the maximum diameter of said base portion to the inside diameter of said standing ring of said base portion being between 1.5 to 1.7, the height of said inner standing wall and the height of said central dome of said base portion being substantially equal, said inner standing wall of said base portion being at an angle of from 7 to 10 degrees to a longitudinal axis through said article, and the wall thickness of said base portion progressively increasing from said outer peripheral wall to said standing ring to said inner standing wall to said central dome.

16. An intermediate article formed by stretch blow-molding an injection-molded preform of polyethylene terephthalate for fabrication into a wide-mouth container suitable for packaging tennis balls or other contents under pressure and being characterized by a flange construction surrounding the mouth of desired strength and thickness for receiving a closure; said intermediate article comprising:

a tubular body portion of high biaxial molecular orientation;

a base portion extending from a lower end of said tubular body portion; and an accommodation portion integrally extending from an upper end of said tubular body portion and comprising (1) a flange of high biaxial molecular orientation extending around and radially outwardly from the upper open end of said tubular body portion and being adapted to be annularly cut at an intermediate location to remove said accommodation portion during fabrication of the wide-mouth container from said intermediate article, and (2) a stepped wall portion of decreasing biaxial molecular orientation extending around and upwardly and inwardly from said flange and including at least two successive upwardly and inwardly extending step means for collecting a quantity of polyethylene terephthalate during blow-molding and for increasing biaxial molecular orientation and controlling the thickness of said flange.

* * * * *

UNITED STATES PATENT AND TRADEMARK OFFICE
CERTIFICATE OF CORRECTION

PATENT NO.  : 4,894,268

DATED       : January 16, 1990

INVENTOR(S) : Donald L. Greenwood and Donald W. Hayward

It is certified that error appears in the above-identified patent and that said Letters Patent is hereby corrected as shown below:

Column 8, lines 3 and 4, "responsive" should be -- respective --.

Column 8, line 48, "point" should be -- points --.

Column 8, lines 50 and 51, "controller" should be -- controlled --.

Column 10, line 51, "or" should be -- of --.

Signed and Sealed this

Twenty-fifth Day of December, 1990

Attest:

HARRY F. MANBECK, JR.

*Attesting Officer*          *Commissioner of Patents and Trademarks*